United States Patent [19]

Pak

[11] Patent Number: 5,475,543

[45] Date of Patent: Dec. 12, 1995

[54] REPEAT REPRODUCTION METHOD FOR MAGNETIC TAPE

[75] Inventor: Yeong-il Pak, Suwon, Rep. of Korea

[73] Assignee: SamSung Electronics Co., Ltd., Suwon, Rep. of Korea

[21] Appl. No.: 398,888

[22] Filed: Aug. 28, 1989

[30] Foreign Application Priority Data

Dec. 31, 1988 [KR] Rep. of Korea ................ 88-18088

[51] Int. Cl.⁶ ........................ G11B 15/52; G11B 15/20
[52] U.S. Cl. .................. 360/74.4; 360/72.1; 360/74.1
[58] Field of Search ................... 360/74.4, 74.1, 360/72.2, 72.1, 14.1, 14.2, 14.3, 13, 12, 10.3, 27

[56] References Cited

U.S. PATENT DOCUMENTS

| | | | |
|---|---|---|---|
| 4,308,563 | 12/1981 | Gohda et al. | 360/72.1 |
| 4,380,438 | 4/1983 | Okamoto | 434/157 |
| 4,463,393 | 7/1984 | Ueki et al. | 360/74.1 |
| 4,499,509 | 2/1985 | Gohda et al. | 360/72.1 |
| 4,628,377 | 12/1986 | Harigaya | 360/72.1 |
| 4,630,137 | 12/1986 | Sekiguchi | 360/13 |
| 4,638,389 | 1/1987 | Barth | 360/72.1 |
| 4,691,251 | 9/1987 | Ookawa et al. | 360/72.1 X |
| 4,897,742 | 1/1990 | Hashimoto | 360/72.1 |

Primary Examiner—Stuart S. Levy
Assistant Examiner—Craig A. Renner
Attorney, Agent, or Firm—Robert E. Bushnell

[57] ABSTRACT

Repeat reproduction method for magnetic tape by which a user can repeatedly reproduce data on the magnetic tape for the arbitrary set section or for previously reproduced section, utilizing a counter to count the number of control pulses on the tape and a timer to activate for a prescribed time.

25 Claims, 2 Drawing Sheets

REPEAT REPRODUCTION METHOD FOR MAGNETIC TAPE

FIELD OF THE INVENTION

This invention relates to a repeat reproduction method for magnetic tape, and more particularly to a method for repeatedly reproducing data in the section of a magnetic tape desired by user in which audio and/or video signals are recorded.

BACKGROUND OF THE INVENTION

A Video Tape Recorder (VTR) or a tape recorder is a device which records and reproduces audio and/or video signals on a magnetic tape. When one uses such a device for the purpose of linguistic drill or athletic excersise, there arises a need to repeatedly reproduce a certain portion of the recorded tape A typical conventional method for this purpose is using "endless tape (or drum, sheet)". As the endless tape is constituted such that a magnetic tape of certain length is to be endlessly circulated in the deck, thus, one can record data in any section of the tape and reproduce them repeatedly. But this method cannot be used to reproduce video signal in video equipment owing to its complicated constitution. Moreover, there arises another problem of elongation of waiting time for reproducing as there are a lot of non-recorded portions when the data length to be repeatedly reproduced is short. To settle the problem, many solutions, for example, detecting non-recorded section and jumping to the recorded section of the tape have been proposed, but they can not be adopted to the reproduction of video signals.

Another conventional repeat reproduction method was disclosed in Japanese patent laid-open NO. Sho 63-52356, which includes two decks in line, and two magnetic tapes each of which contains the same data. The two magnetic tapes are loaded in each deck respectively and repeatedly reproduce the data in the manner that one tape is rewinding while another tape is playing, and vice versa.

This method can be adopted to the repeat reproduction of not only audio signal but also video signal, but it still has some drawbacks. That is, it is very difficult to synchronize the advancing speeds of two tapes which advance inversely of each other, and the system cost of it is very high as it has two decks to pick up the two tapes respectively.

BRIEF SUMMARY OF THE INVENTION

Therefore, it is the object of the invention to provide a repeat reproduction method for magnetic tape by which the user can set a desired section, and repeatedly reproduce the data of the section without employing additional circuitry or hardware in the VTR or tape recorder.

To accomplish the above object of the present invention, there is provided an improved repeat reproduction method for magnetic tape including:

(a) a stage in which counting the number of control pulses picked up from the magnetic tape is initiated and the start point of the repeat reproduction section is set if there is user's demand for repeat reproduction section setting in playing mode, (b) a stage in which a check is made as to the presence or absence of the input of the data corresponding to the demand for the repeat reproduction section setting in stage(a), (c) a stage in which the repeat reproduction mode is set if data is input corresponding to demand of the repeat reproduction setting in stage (b), and a judgment is made if the demand for repeat reproduction concerns prescribed time or predetermined section, (d) a stage in which the tape is rewound for a prescribed time and reproduces it if the demand for repeat reproduction concerns prescribed time in stage (c), (e) a stage in which the tape is rewound to the start point of the repeat reproduction section along with counting the count in reverse value of the control pulses, and reproduces it if the demand for repeat reproduction concerns predetermined section in stage (c).

BRIEF DESCRIPTION OF THE DRAWINGS

Many other features, advantages and additional objects of the present invention will be more apparent from the following description in connection with the accompanying drawings in which.

DETAILED DESCRIPTION OF THE INVENTION

Figure 1:
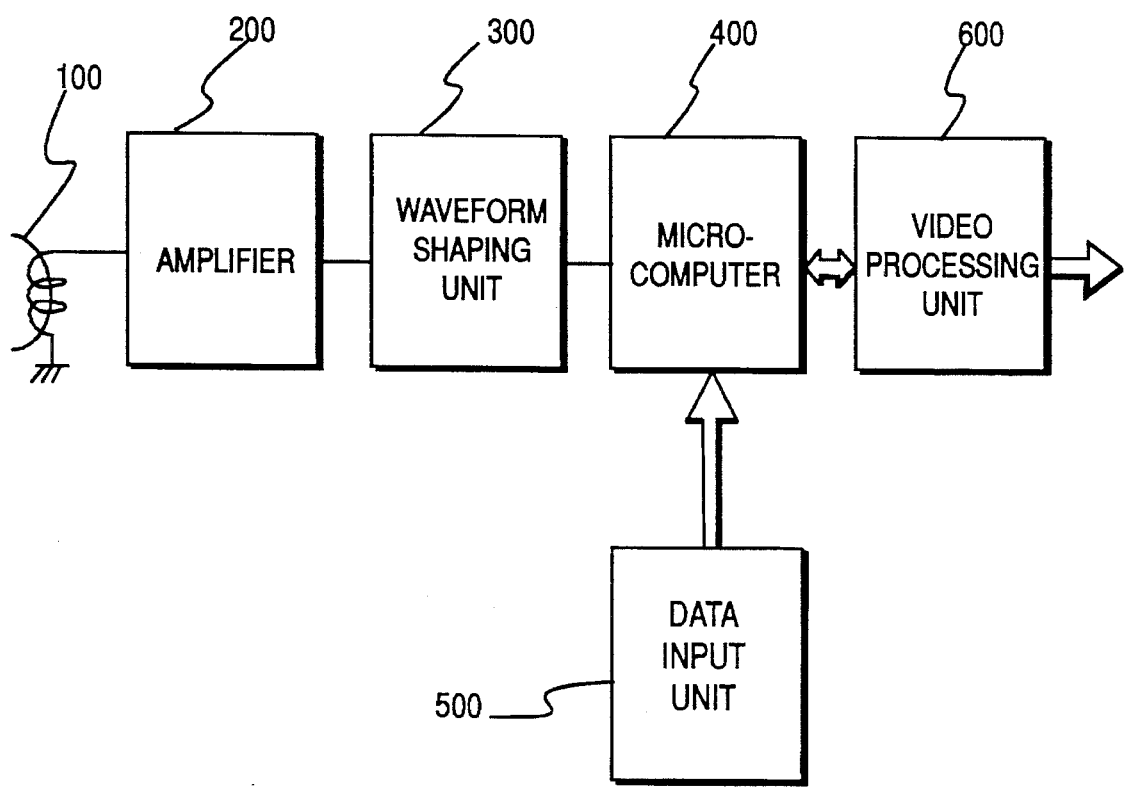
FIG. 1 is a systematic diagram of a VTR suitable for carrying out the method of the present invention.

Referring to FIG. 1, the VTR suitable for carrying out the repeat reproduction method of the present invention includes;

a head 100 which picks up the control pulse recorded on the control track of the video tape; an amplifier 200 which amplifies the picked-up control pulses to a prescribed level; a waveform shaping unit 300 that receives the amplified control pulse as input, converts them into the form of square waves, and outputs them; a data input unit 500 which receives directions of the function desired by user; a video processing unit 600 which processes signals to record or reproduce the audio and/or visual signals in the video tape; and a microcomputer 400 which controls the advancing of the video tape and controls the video processing unit 600, upon receipt of control pulses from the waveform shaping unit 300 and according to the input direction from the data input unit 500.

Figure 2:
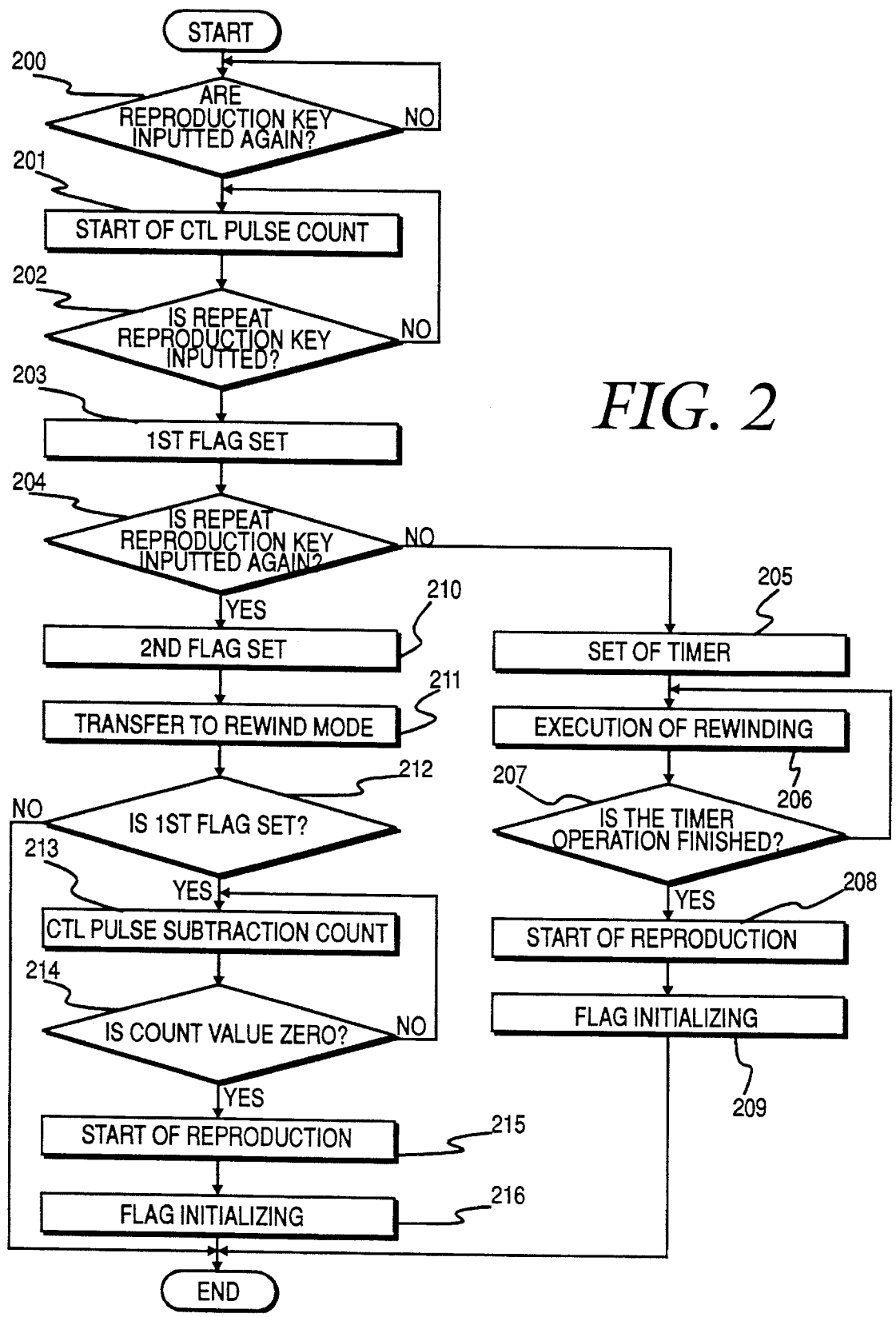
FIG. 2 is a flow chart that shows the repeat reproduction method in accordance with this invention to be used for the system shown in FIG. 1.

The microcomputer 400 shown in FIG. 1 incorporates a system operation control program as shown by way of a flow chart in FIG. 2. The program consists of the following five stages;

the 1st stage in which the repeat reproduction section is set by starting to count the number of control pulses picked up by the head, if the data corresponding to the demand for the repeat reproduction section is inputted, that is, play key data is inputted again, through the data input unit 500 during the time when the system is reproducing the data recorded on the video tape in accordance with the input of reproduction key data;

the 2nd stage in which a check is made as to whether data corresponding to the demand for repeat reproduction, that is, repeat key are inputted via the data input unit 500 in the 1st stage;

the 3rd stage in which the operation of the system is converted into repeat reproduction mode, and a judgment is made as to whether the demand for the repeat reproduction concerns prescribed time or predetermined section if there is a demand for repeat reproduction in the 2nd stage;

the 4th stage in which the tape is rewound for the prescribed time and repeatedly reproduced, if the demand for repeat reproduction is turned out to be one for prescribed time in the 3rd stage;

the 5th stage in which the tape is rewound to the start position of the repeat reproduction section along with counting the subtracted number of control pulses, if the repeat reproduction turns out to be one for predetermined section in the 3rd stage.

Now, repeat reproduction process, according to the present invention, for the system provided with a microcomputer incorporating the above mentioned system operating program, will be explained in detail with reference to FIG. 1 and FIG. 2.

Referring to FIG. 1, the head (100) picks up the control pulses which are periodically recorded on the tape control track for the purpose of controlling the running state of the video tape in the play mode and sends it to the amplifier (200). The amplifier (200) amplifies the picked-up control pulses at a prescribed amplification rate and sends them to the wave-form shaping unit (300). The control pulses, are then converted into square wave form and sent to the microcomputer(400).

The microcomputer(400) thereby controls the tape's running, and also analyzes and processes the data inputted from the data-input unit (500), for control of the video processing unit(600) so as to execute the system's ordinary performance. And the video processing unit 600 will record audio and/or video signals on the video tape, and reproduce it.

Now reffering to FIG. 2 and FIG. 1 the flow chart of the repeat reproduction operation will be explained in detail.

Controlling the video processing unit 600 to display picked up data from the tape on the TV screen according to the input of play key data, the microcomputer 400 judges whether the user demands to set the repeat reproduction section by checking the existence of another input of play key data from data input unit 500(step 200)

If there is another input of play key data in the step 200, microcomputer 400 initiates its internal counter, and adds its values by "1" at every input of control pulse picked up from head 100 and inputted via amplifier 200 and waveform shaping unit 300(step 201)

Executing the above step 201, the microcomputer judges whether the user demands repeat reproduction of the tape by checking the presence of input of repeat key data from data input unit 500(step 202)

If there is first input of repeat key data in the step 202, the microcomputer 400 sets repeat reproduction mode by setting its internal first flag to "1" (step 203), and then judges whether it is repeat reproduction for the prescribed time or for the predetermined section by checking the presence of another input of the repeat key data from the data input unit 500.(step 204)

If it is judged to be the repeat reproduction for the prescribed time as there is no additional input of repeat key data in the step 204, the microcomputer 400 activates the internal timer(step 205), and controls the video processing unit 600 to rewind the tape(step 206).

Executing the step 206, the microcomputer 400 judges whether the prescribed time (for example, five seconds) has lapsed by checking if the timer has finished the operation and is reset (step 207).

If it is judged that the prescribed time has lapsed as the timer finished its operation, the microcomputer 400 controls the video processing unit 600 to stop rewinding of the video tape and to reproduce and display the program on the tape through a television set by running it at a normal speed (step 208).

After executing the step 208, the microcomputer 400 resets the 1st flag to "0", and returns to the ordinary state of operation (step 209).

On the other hand, if there is another input of repeat key data, the microcomputer sets the 2nd flag to "1" to mark it as the repeat reproduction for the predetermined section (step 210).

Then, converts the system to the rewinding mode (step 211), judges again if the present mode is repeat reproduction mode to prevent a false operation of the system by checking the existence of the 1st flag, before rewinding the tape(step 212).

If the 1st flag is set to "1" in the step 212, the microcomputer 400 rewinds the tape, and subtracts the count value of the internal counter by "1", which has been counted from the step 201, at every input of control pulse picked up by head 100 and inputted via amplifier 200 and waveform shaping unit 300 (step 212).

In the above mentioned step 211 to step 213, it is also available to execute rewinding of the tape and subtracting of count value of the control pulse if a check to prevent false operation in the step 212 is omitted.

Executing the above step 213, the microcomputer 400 judges whether the tape has rewound to the starting point of the repeat reproduction section by checking if the subtracted value of the counter is "0".(step 214)

If the count value of the counter is "0" in the step 214, the microcomputer 400 controls the video processing unit 600 to run the tape at normal speed and reproduce the program on the tape through the television set (step 215).

After executing the step 215, the microcomputer 400 resets the internal counter, the 1st flag, and the 2nd flag to "0", and returns to the ordinary state of operation (step 216)

As described above, the repeat reproduction method for magnetic tape according to the present invention improves the function of VTR or tape recorder, by which the user can repeatedly reproduce the arbitrary set section or previously reproduced section, alternatively by use of control pulse recorded on the tape without additional hardware or circuitry.

While the invention has been described in its preferred embodiment, it is to be understood that changes and variations may be made without departing from the spirit or scope of the present invention as recited in the following claims.

What is claimed is:

1. A process of reproducing information stored in an information storage medium by controlling an apparatus, comprising the steps of:

in response to a demand by a user of the storage medium, making a count of control pulses read from the storage medium by the apparatus reading the storage medium;

determining whether repeat data requesting reproduction of information stored on the storage medium has been received by the apparatus subsequent to said demand;

setting the apparatus into a repeat reproduction mode upon determination that said repeat data has been received by the apparatus subsequent to said demand;

setting an indication in response to said setting of the apparatus into said repeat reproduction mode;

making an interpretation by the apparatus of said repeat data on a basis of whether said repeat data has been entered into the apparatus after said setting of the apparatus into said repeat reproduction mode;

specifying one of a first mode, initiating movement of the storage medium for a selected period of time, and a second mode, initiating movement of the storage medium in dependance upon said count, when said repeat data has been entered into the apparatus after setting of the apparatus into said repeat reproduction mode;

specifying the other of said first mode and said second mode when said repeat data has not been entered into the apparatus after said setting of the apparatus into said repeat reproduction mode;

while in said repeat reproduction mode, moving the storage medium relative to the apparatus by moving the storage medium to a start point determined in accordance with said interpretation of said repeat data to enable access by the apparatus to information stored on the storage medium and specified by said repeat data; and reading said information stored on the storage medium, in compliance with said demand.

2. The process of claim 1, further comprising:

while in said repeat reproduction mode, performing said step of moving the storage medium by initiating movement of the storage medium for said period of time prescribed by said repeat data when said interpretation specifies said first mode; and while in said repeat reproduction mode, performing said step of moving the storage medium by initiating movement of the storage medium in dependence upon said count to enable access to said information beginning at said start point when said interpretation specifies said second mode.

3. The process of claim 1, further comprising:

performing said step of interpreting said repeat data by deciding between whether said interpretation of said repeat data prescribes a period of time and whether said interpretation of said repeat data prescribes a section of said storage medium;

while in said repeat reproduction mode performing said step of moving the storage medium when said interpretation of said repeat data prescribes said period of time by moving the storage medium relative to the apparatus for said period of time prescribed by said interpretation of said repeat data; and while in said repeat reproduction mode performing said step of moving the storage medium when said interpretation of said repeat data prescribes a section of the storage medium by moving the storage medium relative to the apparatus in dependence upon said count to enable access to said information beginning at said start point.

4. A process of reproducing information stored in an information storage medium by controlling an apparatus, comprising the steps of:

in response to a demand by a user of the storage medium, making a count of control pulses read from the storage medium by the apparatus engaged in reading the storage medium;

determining whether repeat data requesting reproduction of information stored on the storage medium has been received by the apparatus subsequent to said demand;

setting the apparatus in a repeat reproduction mode when said repeat data is determined to have been received by the apparatus subsequent to said demand;

setting an indication in response to said setting of the apparatus into said repeat reproduction mode;

making an interpretation by the apparatus of said repeat data on a basis of whether said repeat data has been input to the apparatus more than once subsequent to said demand;

specifying one of a first mode, initiating movement of the storage medium for a selected period of time, and a second mode, initiating movement of the storage medium in dependance upon said count, when said repeat data has been entered into said apparatus after said setting of the apparatus into said repeat reproduction mode;

specifying the other of said first mode and said second mode when said repeat data has not been entered into the apparatus after said setting of the apparatus into said repeat reproduction mode;

while in said repeat reproduction mode, moving the storage medium relative to the apparatus by driving the storage medium to a start point determined in accordance with said interpretation of said repeat data to enable access by the apparatus to information stored on the storage medium and requested by said repeat data; and reading said information stored on the storage medium, in compliance with said demand.

5. The process of claim 4, further comprising:

while in said repeat reproduction mode, performing said step of driving the storage medium by moving the storage medium for said period of time prescribed by said repeat data when said interpretation specifies said first mode; and while in said repeat reproduction mode, performing said step of driving the storage medium by moving the storage medium in dependence upon said count to enable access to said information beginning at said start point when said interpretation specifies said second mode.

6. A process of reproducing information stored in an information storage medium by controlling an apparatus, comprising the steps of:

in response to a demand by a user of the storage medium, making a count of control pulses read from the storage medium by the apparatus reading the storage medium;

determining whether repeat data requesting reproduction of information stored on the storage medium has been received by the apparatus subsequent to said demand;

setting the apparatus in a repeat reproduction mode when repeat data is determined to have been received by the apparatus subsequent to said demand;

setting an indication in response to said setting of the apparatus into said repeat reproduction mode;

making an interpretation by the apparatus of said repeat data on a basis of whether a key operable by the user to enter said repeat data into the apparatus has been operated after said setting of the apparatus into said repeat reproduction mode;

specifying one of a first mode, initiating movement of the storage medium for a selected period of time, and a second mode, initiating movement of the storage medium in dependance upon said count, when said repeat data has been entered into said apparatus after said setting of the apparatus into said repeat reproduction mode;

specifying the other of said first mode and said second mode when said repeat data has not been entered into the apparatus after said setting of the apparatus into said repeat reproduction mode;

while in said repeat reproduction mode, moving the storage medium relative to the apparatus by driving the storage medium to a start point in accordance with said interpretation of said repeat data to enable access by the apparatus to information stored on the storage medium and requested by said repeat data; and reading said information stored on the storage medium, in compliance with said demand.

7. The process of claim 6, further comprising:

while in said repeat reproduction mode, performing said step of driving the storage medium by moving the storage medium for said period of time when said interpretation specifies said first mode; and while in said repeat reproduction mode, performing said step of driving the storage medium by moving the storage medium in dependence upon said count to enable access to said information beginning at said start point when said interpretation specifies said second mode.

8. A process of reproducing information stored in a storage medium by controlling an apparatus, comprising the steps of:

in response to a demand by a user of the storage medium, making a count of control pulses read from the storage medium by the apparatus reading the storage medium;

determining whether repeat data requesting reproduction of information stored on the storage medium has been received by the apparatus subsequent to said demand;

setting the apparatus into a repeat reproduction mode when said repeat data is determined to have been received by the apparatus subsequent to said demand;

setting an indication in response to said setting of the apparatus into said repeat reproduction mode;

making an interpretation by the apparatus of said repeat data on a basis of whether a key operable by a user to enter said repeat data into the apparatus has been repeatedly operated subsequent to said demand;

specifying one of a first mode, initiating movement of the storage medium for a selected period of time, and a second mode, initiating movement of the storage medium in dependance upon said count, when said repeat data has been entered into said apparatus after said setting of the apparatus into said repeat reproduction mode;

specifying the other of said first mode and said second mode when said repeat data has not been entered into the apparatus after said setting of the apparatus into said repeat reproduction mode;

while in said repeat reproduction mode, moving the storage medium relative to the apparatus by driving the storage medium to a start point in accordance with said interpretation of said repeat data to enable access by the apparatus to information stored on the storage medium and requested by said repeat data; and reading said information stored on the storage medium, in compliance with said demand.

9. The process of claim 8, further comprising:

while in said repeat reproduction mode, performing said step of driving the storage medium by moving the storage medium for said period of time prescribed by said repeat data when said interpretation specifies said first mode; and while in said repeat reproduction mode, performing said step of driving the storage medium by moving the storage medium in dependence upon said count to enable access to said information beginning at said start point when said interpretation specifies said second mode.

10. An apparatus for providing repeated reproduction of information stored on a information storage medium, comprising:

means for reading information stored on the storage medium;

means for enabling user entry of play key data and repeat key data into the apparatus, said repeat key data requesting reproduction of information stored on the storage medium;

controlling means:

for, in response to said entry of play key data by a user, making a count of control pulses read by said reading means from the storage medium;

for determining whether said entry of said repeat key data has occurred;

for setting the apparatus in a repeat reproduction mode when said entry of said repeat key data is determined to have occurred subsequent to said entry of said play key data;

for setting an indication in response to said setting of the apparatus into said repeat reproduction mode;

for making an interpretation of said repeat key data on a basis of whether said repeat key data has been repeatedly entered into the apparatus after said entry of said play key data;

for specifying one of a first mode, initiating movement of the storage medium for selected period of time, and a second mode, initiating movement of the storage medium in dependance upon said count, when said repeat key data has been entered into said apparatus after said setting of the apparatus into said repeat reproduction mode;

for specifying the other of said first mode and said second mode when said repeat data has not been entered into the apparatus after said setting of the apparatus into said repeat reproduction mode;

for, while in said repeat reproduction mode, initiating movement of the storage medium relative to said apparatus to a start point on the storage medium located in accordance with said interpretation of said repeat key data to enable access by said reading means to information stored on the storage medium and specified by said repeat key data; and means for processing said information read from the storage medium during said repeat reproduction mode.

11. The apparatus of claim 10, further comprised of said controlling means:

while in said repeat reproduction mode performing said step of initiating movement of the storage medium by initiating said movement for said period of time when said interpretation specifies said first mode; and while in said repeat reproduction mode, performs said step of initiating movement of the storage medium by initiating said movement in dependence upon said count when said interpretation specifies said second mode.

12. A repeat reproduction process for an information storage apparatus, comprising the steps of:

determining whether play key data has been entered into the apparatus;

establishing a count value when said play key data has been determined to have been input, by counting a number of control pulses read from a storage medium by the apparatus;

determining whether repeat key data has been input to the apparatus;

setting a repeat reproduction mode when said repeat key data is determined to have been input into the apparatus;

determining whether said repeat key data has been input to the apparatus more than once in succession;

setting a timer and transporting said storage medium relative to the apparatus for a prescribed time period when said repeat key data has not been determined to have been input to the apparatus more than once in succession;

reproducing signals recorded on said storage medium when said transporting of said storage medium for a prescribed time period has been completed;

storing an indication representative of selection of a section of said storage medium for reproduction when said repeat key data has been determined to have been input to the apparatus more than once in succession;

switching from said reproduction mode to a transporting mode and transporting said storage medium relative to the apparatus for a prescribed period of time when said repeat key data has been determined to have not been input to the apparatus more than once in succession;

transporting said storage medium relative to the apparatus to said section of the storage medium while counting to a predetermined count value from said established count value when said repeat key data has been determined to have been input to the apparatus more than once in succession; and reproducing signals recorded on said storage medium when said predetermined count value has been reached.

13. The process of claim 12, further comprised of the step of:

determining on a basis of whether said repeat key data has been input to the apparatus more than once in succession, before transporting said storage medium, whether said repeat key data specifies one of said prescribed period of time and said selected section of said storage medium.

14. A repeat reproduction method for reading information from an information storage medium by controlling an apparatus including a microcomputer, said method comprising the steps of:

determining whether play key data is input to said microcomputer during a reproduction mode of said apparatus;

counting control pulses picked up from the storage medium by a head of said apparatus, for assembling an established count value when said play key data is determined to have been input;

determining whether repeat key data requesting reproduction of information stored on the storage medium has been input to said microcomputer;

setting said apparatus into a repeat reproduction mode when said repeat key data is determined to have been input;

determining whether said repeat key data has been again input to said microcomputer;

setting a timer and initiating transportation of the storage medium for a prescribed time period when said repeat key data is determined to have not been again input to said microcomputer;

reproducing information stored on the storage medium when said transportation for a prescribed time period has ended;

setting a flag in said microcomputer to indicate a section of the storage medium for reproduction when said repeat key data has been determined to have been again input to said microcomputer;

switching from said reproduction mode to a rewinding mode and determining when said flag has been set;

initiating transportation of the storage medium and counting down to a predetermined count value from said established count value when said flag has been determined to have been set; and reproducing information stored on the storage medium when said predetermined count value has been reached.

15. The method as claimed in claim 14, wherein said information being reproduced comprises audio signals.

16. The method as claimed in claim 14, wherein said information being reproduced comprises video signals.

17. The method as claimed in claim 14, wherein said information being reproduced comprises video signals and audio signals.

18. The method as claimed in claim 14, further comprising the steps of:

amplifying said control pulses picked up by said head for producing amplified control pulses;

wave-shaping said amplified control pulses to produce shaped control pulses; and applying said shaped control pulses to said microcomputer to enable said counting of control pulses.

19. The method as claimed in claim 18, wherein said shaped control pulses are square wave pulses.

20. A tape recorder for repeat reproduction of a magnetic tape, said tape recorder comprising:

controlling means:

for determining whether play key data is input from a play key during a reproduction mode of said tape recorder, for counting a number of control pulses read from the magnetic tape, by a head of said tape recorder, for assembling an established count value based upon said number once said play key data is determined to have been input, for determining whether repeat key data from a repeat key is input, for setting a repeat reproduction mode once said repeat key data is determined to have been input, for determining whether said repeat key data is again input, for setting a timer and rewinding the magnetic tape for a prescribed time period once said repeat key data has been determined to have not been again input, for reproducing signals recorded on said magnetic tape when said rewinding for a prescribed time period has ended, for setting a flag to indicate a desired section of the magnetic tape for reproduction once said repeat key data has been determined to have been again input, for switching from said reproduction mode to a rewinding mode and for determining if said flag has been set, and for controlling rewinding of the magnetic tape by incrementally changing said established count value in dependence upon control pulses read from the magnetic tape after said repeat key data has been determined to have been again input until said established count value equals a predetermined count value; and means for reproducing said signals recorded on the magnetic tape when said established count value equals said predetermined count value.

21. The tape recorder as claimed in claim 20, wherein said signals being reproduced are audio signals.

22. The tape recorder as claimed in claim 20, wherein said signals being reproduced are video signals.

23. The tape recorder as claimed in claim 20, wherein said signals being reproduced are video signals and audio signals.

24. The tape recorder as claimed in claim 20, further comprising: means for providing amplified pulses by amplifying pulses read by said head; means for wave-shaping said amplified pulses to produce said control pulses; and means for applying said control pulses to said controlling means for counting.

25. The tape recorder as claimed in claim 24, wherein said control pulses are square wave pulses.

* * * * *